United States Patent [19]

Newman

[11] Patent Number: 4,763,861
[45] Date of Patent: Aug. 16, 1988

[54] MICROWAVE RENDEZVOUS SYSTEM FOR AERIAL REFUELING

[75] Inventor: Frank J. Newman, Wichita, Kans.

[73] Assignee: The Boeing Company, Seattle, Wash.

[21] Appl. No.: 22,611

[22] Filed: Mar. 5, 1987

Related U.S. Application Data

[63] Continuation of Ser. No. 756,584, Jul. 19, 1985, abandoned.

[51] Int. Cl.4 .............................................. B64D 39/00
[52] U.S. Cl. .................................................. 244/134 A
[58] Field of Search .................. 244/135 A, 161, 185, 244/114 R; 114/261; 340/407; 343/408, 5 BD, 5 LS, 5 PD

[56] References Cited

U.S. PATENT DOCUMENTS

| | | | |
|---|---|---|---|
| 2,941,761 | 6/1960 | Cox et al. | 244/135 A |
| 3,285,544 | 11/1966 | Chope et al. | 244/135 A |
| 3,487,411 | 12/1969 | Toman | 343/408 |
| 4,025,193 | 5/1977 | Pond | 364/424 |
| 4,485,384 | 11/1984 | Connor | 343/408 |

Primary Examiner—Jeffrey V. Nase
Assistant Examiner—Rodney Corl
Attorney, Agent, or Firm—Finnegan, Henderson, Farabow, Garrett & Dunner

[57] ABSTRACT

A microwave rendezvous system for use on a tanker aircraft for aerial refueling of a receiver aircraft. The tanker providing a larger rendezvous envelope in space between the tanker and receiver aircraft thereby requiring less tedious navigation and attention during a refueling operation.

1 Claim, 1 Drawing Sheet

MICROWAVE RENDEZVOUS SYSTEM FOR AERIAL REFUELING

This application is a continuation of application Ser. No. 756,584, filed July 19, 1985, now abandoned.

BACKGROUND OF THE INVENTION

This invention relates to an aerial refueling system and more particularly but not by way of limitation to a microwave rendezvous system for use on a tanker aircraft for aerial refueling of a receiver aircraft.

Heretofore, the rendezvous of a tanker aircraft with a receiver aircraft for the purpose of air refueling was a difficult task in the best weather conditions. Both the tanker navigator and the receiver pilot must direct much of their attention to precise navigation, critical timing and speed control in order for visual contact to be obtained for the refueling operation.

In adverse weather aerial refueling may be virtually impossible. Even in cloudless daytime weather some rendezvous missions have been unsuccessful because the receiver pilot was unable to visually find the tanker. There has also been at least one incident involving a receiver aircraft colliding into the tailend of a civilian aircraft at night because the receiver pilot had mistaken the aircraft for a tanker. The rendezvous mission provides a burden of attention-consuming navigation and timing and yet this information may fail to guide the receiver pilot close enough to safely find the tanker. To add to this complexity, in war-time situations, ground-based navigational aids and radio transmissions cannot be used.

Currently a complex method of navigational procedures for a rendezvous mission is used by the airforce. The method employs the use of inertial navigational system (INS), air-to-air ground radar, air-to-air radar, air-to-air TACAN, drift angle true air-speed (TAS), or any combination thereof. There are various rendezvous patterns for different missions and receiver aircraft types, but the goal of each method is to position the receiver aircraft 2-3 miles behind and 1,000 feet below the tanker. Using INS, air-to-ground radar, and air-to-air radar demands considerable time and concentration from both the tanker navigator and the receiver pilot and/or navigator. Monitoring the TAS, drift angles, offset position, estimated time of arrival (ETA) to air refueling initial point (ARIP), course, and ETA to the air-refueling contact point (ARCP) is difficult, to say the least. Even if all the systems are working properly, it remains a major task to position the tanker and receiver aircraft at the proper position at the proper time, flying at the proper speeds.

Additional problems include the limitations of the TACAN and radar systems. On the KC-135 tankers, the TACAN provides range only. At best, the TACAN can assist the receiver pilot to about ½ mile from the tanker aircraft. Likewise, the air-to-air radar is unusable within ½ mile. In adverse weather, these limitations would make a successful rendezvous highly unlikely. Also, the only elevation information the receiver pilot has with reference to the tanker is based solely on altimeter readings.

TACAN and radar transmission broadcast electromagnetic radiation and are virtually omnidirectional. This enables easier detection by electronic sensors of potential enemies which during a war-time situation would be highly undesirable.

In the following U.S. Patents: U.S. Pat. No. 2,157,122 to Dunmore; U.S. Pat. No. 3,052,882 to Pidhayny et al; U.S. Pat. No. 3,285,544 to Chope et al and U.S. Pat. No. 4,128,839 to McComas various types of refueling systems are disclosed. None of these patents point out the particular unique features and advantages of the subject system as described herein.

SUMMARY OF THE INVENTION

The subject microwave rendezvous system for aerial refueling provides a much larger rendezvous envelope in space that requires less tedious navigation and attention during a refueling operation when compared to prior refueling systems.

The rendezvous system is very precise and can be used safely and easily in adverse weather. Proper tanker identity by the receiver aircraft can be maintained by frequency selection. No voice radio transmissions are required using the subject invention. The rendezvous system can accomodate several receiver aircraft simultaneously and safely.

The antenna size of the system can be reduced for aerodynamic reasons and is easily adaptable for installation in the aft end of the tanker aircraft.

The area of transmission is highly directional (not omni-directional) and can be varied to broad area down to a narrow area which may be desirable in certain military situations.

The rendezvous system could be employed on rendezvousing space vehicles, such as a space station or space shuttle.

The microwave rendezvous system for use on a tanker aircraft for aerial refueling of a receiver aircraft includes a microwave landing device placed in the aft end of the tanker aircraft. The device has the capability for the selection of different frequency transmission so that a predetermined frequency can be assigned to the receiver aircraft to be refueled. The microwave landing device may be combined with precision distance measuring equipment for providing range distance information with accuracy to 100 ft. or greater for precision in connecting the tanker aircraft to the receiver aircraft for being refueled. The microwave landing device has a maximum horizontal azimuth coverage in the range of 120 degrees with a vertical glide slope coverage in the range of 20 degrees. This can be narrowed when desired.

Multiple receiver aircraft can be safely accommodated simultaneously when following different prescribed courses.

The advantages and objects of the invention will become evident from the following detailed description of the drawings when read in connection with the accompanying drawings which illustrate preferred embodiments.

DETAILED DESCRIPTION OF THE DRAWINGS

Figure 1:
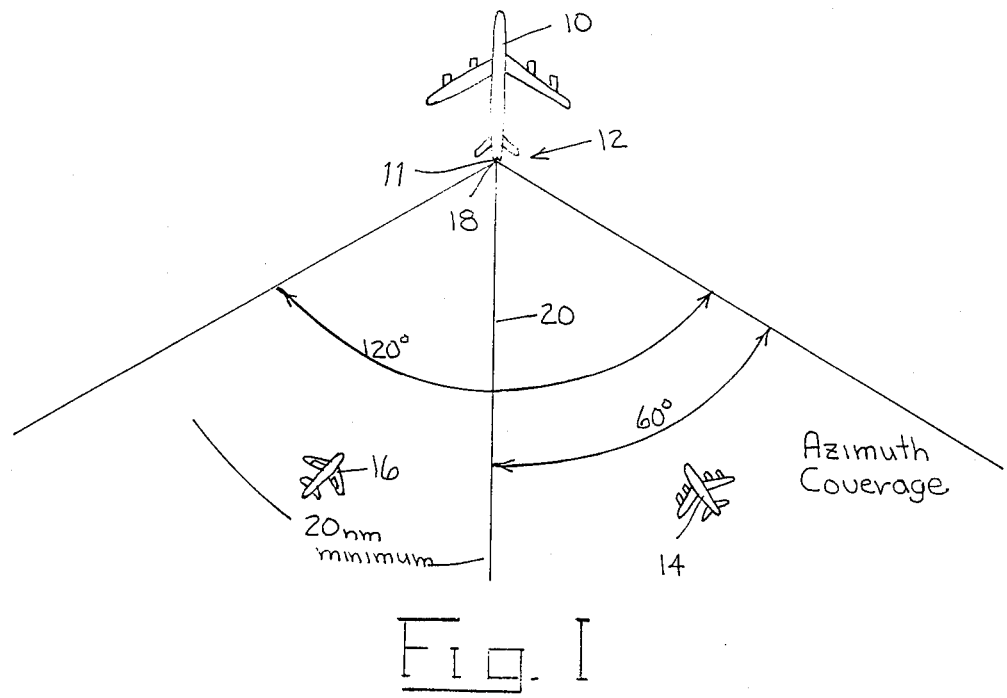
FIG. 1 is a top view of a tanker aircraft illustrating the azimuth coverage of the rendezvous system.

In FIG. 1 a top view of a tanker aircraft 10 is illustrated with the microwave rendezvous system designated by general reference numeral 12 mounted in the aft end of the aircraft 10. The microwave rendezvous system 12 is made up of a standard microwave landing device 11 which has been used previously by the United States Airforce but has never been presently used in refueling tanker aircraft. Through the use of the rendezvous system 12, receiver aircraft indicated by numeral 14 and 16 will be able to select a predetermined frequency and fly an approach to the tanker aircraft 10 much like an instrument landing system (ILS) currently used in the aircraft industry. The microwave landing device 11 may be used in conjunction with a precision distance measuring equipment (DME) 18 which will provide distance range information with accuracy up to 100 feet between the tanker aircraft 10 and the receiver aircrafts 14 and 16.

The microwave landing device 11 has an azimuth coverage zone or navigable divergence from a center line 20 through the length of the tanker aircraft 10 up to 60 degrees right and left of the center line 20 for a total of 120 degrees. This provides a horizontal azimuth coverage as illustrated in FIG. 1. The microwave landing device 11 typically has a minimum range of 20 nautical miles and a range of up to 30 nautical miles or greater.

Figure 2:
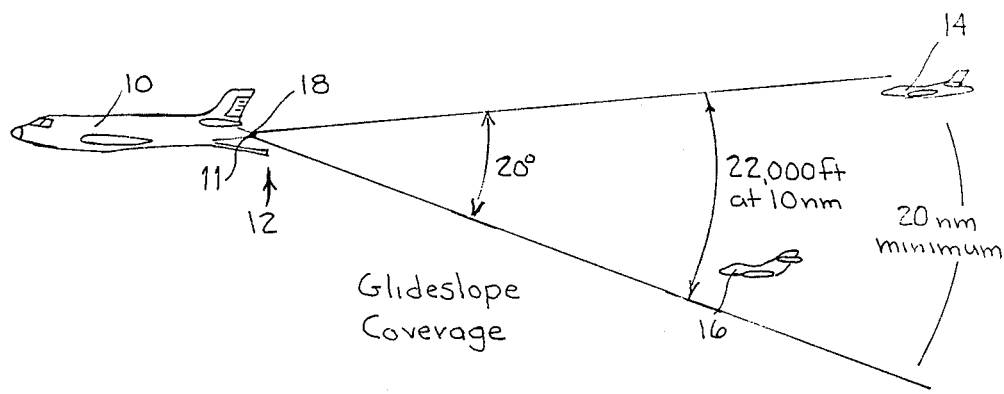
FIG. 2 illustrates the tanker aircraft with the glide slope coverage using the rendezvous system.

The glide slope or vertical coverage of the microwave landing device 11 is illustrated in FIG. 2. The glide slope or vertical coverage is typically in the range of 20 degrees. With the system 12 placed in the aft end of the tanker 10, the receiver pilot would merely have to place his aircraft anywhere between the tanker 10 having a 120 degree coverage from the aft end of the tanker 10 and within 20 to 30 nautical miles and then fly a precision approach to the tanker 10 while receiving the remaining distance information from the precise distance measuring equipment 18. The receiver pilot would not have to concern himself with maintaining a certain altitude, for example, one to two thousand feet below the tanker. With a range of 20 degrees of the vertical glide slope coverage of the microwave landing device 11, the receiver pilot has an envelope typically of 22,000 feet at 10 nautical miles. Further, he would have more than this at a greater distance, for example, in the range of 20 nautical miles.

Aside from turbulence, weather would provide no problem using the subject system 12. The glide slope (vertical coverage) and localizer (azimuth coverage) antennaes may be gyrostabilized to enhance navigation during turbulence. Frequency could be selected on the microwave landing device 11 much like radio frequency so tankers in a cell could use a different frequency for different receiver aircraft, eliminating confusion over which tanker is to be used for a particular receiver. This method would be easily adapted during a radio silence environment.

While the subject system 12 is discussed using a tanker aircraft 10 with receiver aircraft 14 and 16, it should be appreciated that this system could be used equally well for space docking and other rendezvous type systems.

Changes may be made in the construction and arrangement of the parts or elements of the embodiments as described herein without departing from the spirit or scope of the invention defined in the following claims.

I claim:

1. A system for guiding rendezvous between a tanker aircraft and receiver aircraft, the system comprising:

microwave transmitter means carried by said tanker aircraft for directionally generating aft of said tanker aircraft to a distance of at least about twenty miles predetermined diverging horizontal and vertical azimuth signals, said transmitter means including means for selectively changing the frequency of said signals, said signals being usable by standard microwave landing system equipment carried by said receiver aircraft to provide rendezvous guidance to said receiver aircraft; and means carried by said tanker aircraft for directionally generating aft of said tanker aircraft a signal usable by standard precision distance measuring equipment carried by said receiver aircraft to provide range guidance to said receiver aircraft.

* * * * *